United States Patent

[11] 3,626,065

[72] Inventors Hideyuki Maekawa
  Osaka-shi;
  Shohei Egawa, Amagasaki-shi, both of Japan
[21] Appl. No. 731,978
[22] Filed May 24, 1968
[45] Patented Dec. 7, 1971
[73] Assignee Shionogi & Co., Ltd.
  Osaka, Japan
[32] Priority May 25, 1967
[33] Japan
[31] 42/33243

[54] STABLE AQUEOUS MULTIVITAMIN PREPARATIONS
  2 Claims, 2 Drawing Figs.
[52] U.S. Cl. .................................................. 424/255,
  424/266, 424/280, 424/344
[51] Int. Cl. ........................................................ A61k 15/00
[50] Field of Search ........................................... 424/280, 255

[56] References Cited
UNITED STATES PATENTS
2,811,483 10/1957 Atero et al. .................. 424/280
3,168,440 2/1965 Meyer ........................... 424/104

OTHER REFERENCES
The Physicians' Desk Reference, 1965, 19th Edition page 977
Remington's Pharmaceutical Sciences, 13th Edition, 1965, pp. 1078, 1079, 1090, 1094, 1095, 1096, 1102, 1103.

Primary Examiner—Albert T. Meyers
Assistant Examiner—Norman A. Drezin
Attorney—Wenderoth, Lind & Ponack ABSTRACT: This invention relates to stable aqueous multivitamin preparations in which the vitamin A ingredient is isolated together with the vitamin C and nicotinamide ingredients from other ingredients including the vitamin $B_1$ ingredient.

PATENTED DEC 7 1971

3,626,065

INVENTORS
HIDEYUKI MAEKAWA
SHOHEI EGAWA

BY Wenderoth, Lind & Ponack
ATTORNEYS

STABLE AQUEOUS MULTIVITAMIN PREPARATIONS

This invention relates to stable aqueous multivitamin preparations containing vitamin A, vitamin $B_1$, vitamin C, nicotinamide, etc. and, in particular, relates to aqueous multivitamin preparations containing a stabilized vitamin A ingredient. A primary object of the invention is to provide stable aqueous multivitamin preparations containing vitamin A, vitamin C and nicotinamide as the essential ingredients thereof. A further object of the invention is to provide stable aqueous multivitamin preparations containing the above three ingredients and vitamin $B_1$ as the essential ingredients thereof.

Figure 1:
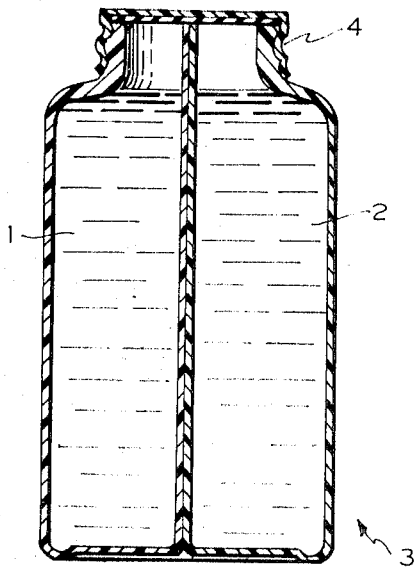
Figure 2:
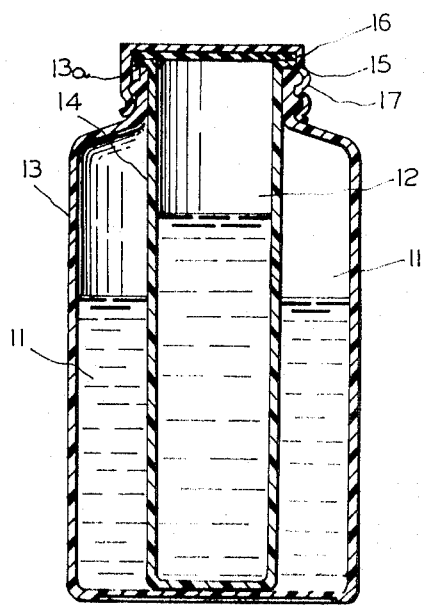

Other objects, the gist, the exact nature, the advantages, and general and specific embodiments of the invention will appear more fully hereinafter by referring to the following description and the accompanying drawings, in which:

FIG. 1 is a vertical sectional view of a container which can be used for embodying the invention, said container being filled with a multivitamin preparation prepared according to the invention: and FIG. 2 is a vertical sectional view of a further specific container which can be used for embodying the invention, said specific container being filled with a multivitamin preparation prepared according to the invention.

It has hitherto been known that vitamin $B_1$ vitamin C and vitamin A (hereinafter referred to as $VB_1$, VC and VA respectively) are considerably unstable in aqueous multivitamin preparations. This phenomenon, as to $VB_1$ and VC depends on the difference in stable pH region against "hydrolysis." Namely, $VB_1$ and VC are stable against hydrolysis in different pH regions thereof, below pH 4.0 for $VB_1$ and pH 5.0 to 7.0 for VC. Therefore, it is impossible to select optimum pH conditions for the two jointly. It is presumed, in the art, that the decomposition of VA may be accelerated by the decomposition products of $VB_1$ or VC.

In these circumstances, it is recommended to assure and retain the quality of the aqueous multivitamin preparation in such manner that each vitamin ingredient constituting the preparation is separately packed so that they are maintained apart from each other and that the several ingredients are dissolved together in an aqueous medium immediately before use. However, this plan is difficult to realize in actual practice because, according to this plan, the customers are obliged to carry out multiple compounding procedures. Thus, in general, the pH of the aqueous multivitamin preparations on the market is adjusted to stabilize either $VB_1$ or VC, or, alternatively the pH is maintained at 4.0—5.0. These methods are clearly unsatisfactory, because the former sacrifices one or more vitamins to a specific vitamin and the latter is only a compromise. The following table I is concerned with an aging test of several aqueous multivitamin preparations adjusted at pH 3.0, 4.5 and 6.0. Each sample contains 3 mg. of VA, 7.5 mg. of vitamin $D_2$ (hereinafter referred to as $VD_2$), 2.5 mg. of $VB_1$, 3.5 mg. of vitamin $B_2$ phosphate (hereinafter referred to as $VB_2$ phosphate), 2.5 mg. of vitamin $B_6$ (hereinafter referred to as $VB_6$), 70 mg. of VC and 25 mg. of nicotinamide, respectively, per 1 ml. of the sample solution. All the samples were sealed in glass bottles and stored at 35° C. for 4 weeks. The data prove the unstability of the specific vitamins in admixed condition as described supra.

TABLE I

| pH of Samples | Retention Percentage of Vitamins | | |
|---|---|---|---|
| | VA | $VB_1$ | VC |
| 3.0 | 92.5 | 98.5 | 90.3 |
| 4.5 | 92.8 | 91.2 | 95.8 |
| 6.0 | 93.6 | 88.1 | 98.4 |

As seen from the above result, there is no suitable manner to prevent the decomposition of VA by aging, and such decomposition is increased more in plastic containers. For example, in the test with polyethylene-made bottles instead of glass bottles, the retention of VA was 78.5, 79.4 and 82.3 percent respectively (this fact is probably caused by oxygen permeability of the plastic container).

On the basis of the above, the inventors investigated the influence of several vitamins against VA in liquid state (containing 2,500 international units/ml. of VA) in glass bottles. The results were as in the following table II.

TABLE II

| Composition of samples (mg./ml. except for VA) | | | | VA retention percentages | | | |
|---|---|---|---|---|---|---|---|
| | | | | 35° C, 4 weeks elapsed | | Room temperature 1 year elapsed | |
| VA | $VB^1$ | VC | Nicotinamide | pH 3.0 | pH 6.0 | pH 3.0 | pH 6.0 |
| Exist | 5 | None | None | 92.1 | 90.8 | 90.5 | 90.2 |
| Do | None | 70 | None | 92.0 | 93.8 | 88.8 | 90.6 |
| Do | 5 | 70 | None | 90.5 | 90.0 | 89.0 | 87.5 |
| Do | 5 | None | 25 | 91.9 | 89.5 | 89.5 | 87.6 |
| Do | None | 70 | 25 | 96.5 | 97.0 | 95.7 | 95.8 |
| Do | 5 | 70 | 25 | 93.4 | 91.5 | 90.4 | 88.5 |
| Do* | None | None | None | 96.8 | 97.2 | 96.0 | 96.2 |

*Control.

As seen from the above table II, it is undoubted that the VA was stabilized by the coexistence of VC and nicotinamide. Namely, the stability of VA was approximately equal to that of the control, when VC and nicotinamide coexisted, and this inclination reappeared also in a test using polyethylene bottles as in the following table III.

TABLE III

| Composition of samples (mg./ml. except for VA) | | | | VA retention percentages | | | |
|---|---|---|---|---|---|---|---|
| | | | | 35° C, 4 weeks elapsed | | Room temperature 1 year elapsed | |
| VA | $VB^1$ | VC | Nicotinamide | pH 3.0 | pH 6.0 | pH 3.0 | pH 6.0 |
| Exist | 5 | None | None | 86.6 | 83.3 | 81.4 | 79.5 |
| Do | None | 70 | None | 86.2 | 88.1 | 80.3 | 82.8 |
| Do | 5 | 70 | None | 84.0 | 80.2 | 78.6 | 79.0 |
| Do | 5 | None | 25 | 87.2 | 82.6 | 83.0 | 82.2 |
| Do | None | 70 | 25 | 93.2 | 94.6 | 91.2 | 93.2 |
| Do | 5 | 70 | 25 | 85.8 | 83.8 | 82.2 | 80.5 |
| Do* | None | None | None | 93.5 | 94.4 | 90.4 | 92.6 |

*Control.

From the above findings, it is clear that the coexistence of VC and nicotinamide is advantageous to the stabilization of VA. However, multivitamin preparations generally must contain $VB_1$ as an indispensable ingredient and this vitamin injures VA coexisting therewith as is clearly seen from tables II and III in which $VB_1$ coexists with VA, VC and nicotinamide. Accordingly, in aqueous multivitamin preparations, a stable preparation, in particular as to VA, will be obtained by separating the VA ingredient together with VC and nicotinamide from the $VB_1$. This result was confirmed by the following test. In the test, two kinds of unit solution, No. 1 and No. 2, are used. The No. 1 solution contained 3 mg./ml. of VA, 7.5 mg./ml. of $VD_2$, 70 mg./ml. of VC and 25 mg./ml. of nicotinamide, and the No. 2 solution contained 3 mg./ml. of $VB_1$, 3.5 mg./ml. of $VB_2$ phosphate and 2.5 mg./ml. of $VB_6$, respectively. Each solution was sealed in a glass or polyethylene bottle and the retention of VA, $VB_1$ and VC was determined after 4 weeks' aging at 35° C. The results were as in the following table IV.

| Unit solution | | Vitamin retention percentages | | | | | |
|---|---|---|---|---|---|---|---|
| | | In glass bottles | | | In polyethylene bottles | | |
| Number | pH | VA | $VB_1$ | VC | VA | $VB_1$ | VC |
| 1 | 6.0 | 97.0 | | 99.0 | 94.3 | | 98.2 |
| 2 | 3.0 | | 98.4 | | | 98.3 | |

These results remarkably show an improvement in the stability of vitamins, particularly of VA, in an aqueous multivitamin preparation, in comparison with the results of table I. Namely, the retention of VA increased up to 97 percent from 93.6 percent by isolating the $VB_1$ and by making the VA coexist with the VC and nicotinamide.

The present invention is based on the above findings. The gist of the invention is to divide the aqueous multivitamin preparation into two parts, one (the first liquid) of which contains VA, VC and nicotinamide as the essential ingredients but does not contain $VB_1$ and the other (the second liquid) of which contains $VB_1$ as the essential ingredient but does not contain VA. The invention is also applicable for $VB_1$-free aqueous multivitamin preparations containing VA as the essential ingredient. In the latter case, the second liquid containing $VB_1$ is not necessitated.

The first liquid must contain VA, VC and nicotinamide as its essential ingredients among many vitamins constituting an aqueous multivitamin preparation, but it is optional to add other vitamin(s) except for $VB_1$. On the other hand, the second liquid must contain $VB_1$, but it is optional to add other vitamin(s) except for VA, and VC and nicotinamide can voluntarily be added thereto, if need be. However, since, in general, the optimum ranges of pH condition differ between the first liquid and the second liquid, respectively, the vitamin(s) other than essential and incompatible may be admixed into either of the two liquids in consideration of suitable pH range(s) thereof. Besides, there will be no need to dwell upon other additives such as mineral(s), amino acid(s), pH controlling agent(s), sweetening agent(s), viscosity-increasing agent(s), perfume(s), edible pigment(s) and surfactant(s), because these additives are common auxiliary ingredients in the aqueous multivitamin preparations.

The multivitamin preparations according to the present invention are, in general, divided into two kinds of liquid, and each liquid is packed in a bottle-type container, respectively; and the contents of the respective bottles are admixed together at use by the customer. However, it becomes more convenient, if a duplex container having two independent chambers filled with the unit liquid respectively is used as shown in the following examples.

The invention is further embodied and exemplified by the following examples, but the examples are illustrative only and are not intended to be limitative of the invention.

EXAMPLE 1 [The first liquid]:

Five hundred mg. (milligrams) of VA palmitate and 1.5 mg. of $VD_2$ were dissolved in 10 g. (grams) of polysorbate 80. The solution thus formed was added to 60 ml. (milliliters) of distilled water with stirring to give a homogenous solution. To the solution, there were added 15 g. of VC, 5 g. of nicotinamide and 600 mg. of soluble saccharin to give a homogeneous solution. Then, the solution was adjusted to pH 6.0 with aqueous sodium hydroxide solution, and finally, adjusted to 100 ml. totally by addition of distilled water. The final solution was sealed in a glass bottle.

[The second liquid]:

To 50 ml. of distilled water, there were added 500 mg. of $VB_1$, 500 mg. of $VB_2$ phosphate, 200 mg. of pantothenyl alcohol and 30 g. of sugar, and the mixture, then, was homogeneously dissolved. The homogeneous solution thus prepared was adjusted to pH 3.0 with aqueous hydrochloric acid, adjusted to 100 ml. totally with distilled water and sealed in another glass bottle.

The two liquids thus prepared are admixed together immediately before use.

EXAMPLE 2

[The first liquid]:

Five hundred milligrams of VA palmitate and 1.5 mg. of $VD_2$ were dissolved in 10 g. of polysorbate 80. To this solution thus prepared, there was added 60 ml. of distilled water with stirring to give a homogenous solution. To the latter solution, 10 g. of VC, 3 g. of nicotinamide and 20 g. of sugar were added and dissolved therein. The solution thus prepared was then adjusted to pH 6.0 with aqueous sodium hydroxide solution and further adjusted to 100 ml. totally by addition of distilled water.

[The second liquid]:

One hundred milliliters of the second liquid was prepared after the manner of the second liquid in the above example 1 from 500 mg. of $VB_1$, 500 mg. of $VB_2$ phosphate, 500 mg. of $VB_6$, 200 mg. of pantothenyl alcohol, 20 g. of L-lysine hydrochloride, 20 g. of sugar, residual amount of distilled water and small amount of aqueous hydrochloric acid for pH regulation.

The two liquids were separately poured into chamber 1 or 2 of the partitioned container 3 and sealed with the screw cap 4 shown in FIG. 1 of the accompanying drawings. The respective contents of the container are admixed together in a suitable dispenser (not shown) before use. The container 3 can be of polyethylene. The contacting surfaces of chambers 1 and 2 can be essentially integrated by means of a suitable adhesive or the like, if desired.

EXAMPLE 3

The two liquids prepared according to example 1 are filled one by one into one or the other of chambers 11 and 12 of the device according to FIG. 2 of the accompanying drawings. In this example, a bottomed inner tube 14 consisting of a suitable plastic material has a horizontal flange portion 15 surrounding the upper open end thereof and hangs on the brim 13a of the main container 13 by the under surface of the said flange. In this way, a space inside the inner tube and another space inside the main container are tightly sealed by the contact between the upper surface of the aforementioned flange 15 and the under surface of a gasket 16 provided at the inside of a cap 17 and by the engagement between the outer wall of the said inner tube 14 and the inner wall of the said main container 13, and by the contact between the under surface of the flange 15 and the brim 13a of the said main container 13, respectively.

At use, the inner tube 14 is pulled out from the main container 13, and the contents in said tube are poured into said main container for mixing. The cap 17 is screwed again on the mouth of the main container to preserve the remaining contents post the use. The inner tube is discarded after the mixing.

Having thus described the invention, what is claimed is:

1. A stable aqueous multivitamin preparation in a unitary package consisting of two kinds of unit liquids, one of which is at about pH 6.0 containing vitamin A, vitamin C and nicotinamide as the essential vitamin ingredients thereof; and the other of which is at about pH 3.0 containing vitamin B1 as the essential vitamin ingredient thereof.

2. A stable aqueous multivitamin preparation which contains vitamin A, vitamin C and nicotinamide as essential vitamin ingredients thereof and is free from vitamin $B_1$, the pH of said preparation being about 6.0.

* * * * *